United States Patent [19]
Howarth et al.

[11] 3,756,123
[45] Sept. 4, 1973

[54] SYNCHRONIZED HYDRAULIC SERVO MOTOR SYSTEM

[75] Inventors: Roger E. Howarth; William M. McGuigan, both of San Diego, Calif.; David A. Murday, Oxhey Watford, Herts County, England

[73] Assignee: Rohr Corporation, Chula Vista, Calif.

[22] Filed: June 1, 1971

[21] Appl. No.: 148,740

[52] U.S. Cl. ................................ 91/171, 60/97 E
[51] Int. Cl. ...................... F01b 25/04, F15b 11/22
[58] Field of Search ..................... 91/171; 60/97 E

[56] References Cited
UNITED STATES PATENTS

| | | | |
|---|---|---|---|
| 2,380,973 | 8/1945 | Kopp | 91/171 |
| 2,859,591 | 11/1958 | Zimmerman | 60/97 E |
| 3,033,219 | 5/1962 | Erle | 91/171 |
| 3,364,820 | 1/1968 | Stockwell | 91/171 |

Primary Examiner—Paul E. Maslousky
Attorney—George E. Pearson

[57] ABSTRACT

Hydraulic system for moving common load or separate loads requires all drive members to move in synchronism. Two or more hydraulic servo motors are each provided with a hydraulically movable drive member. A synchronizing valve is interposed either in the conduit from the pressure fluid supply to each motor or in the conduit from each motor to the fluid reservoir to modulate the flow to its associated motor and includes two valve members which move with and with respect to each other. One valve member of each valve is attached to the drive member of its associated motor and the other valve member is attached to the drive member of the next preceding or succeeding motor so that all of the valves and motors are connected in a mechanical "closed-loop" series. When all motors are in synchronism, the two members of each valve move in the same direction in synchronism and do not affect the fluid flow. If any motor advances ahead of synchronism, the members of its associated valve are caused to move with respect to each other by mechanical linkages to restrict fluid flow and retard the leading motor until it is returned to synchronism. The system may be designed to one-direction operation or two-direction operation. In the one-direction system, a closed loop arrangement is not essential. In a modification, the valve porting may be arranged to restrict flow to the leading motor and also increase flow to the lagging motor to accelerate the return to synchronism. In a further modification, the porting may be shaped to give varying rates of change of flow for each increment of relative movement.

12 Claims, 9 Drawing Figures

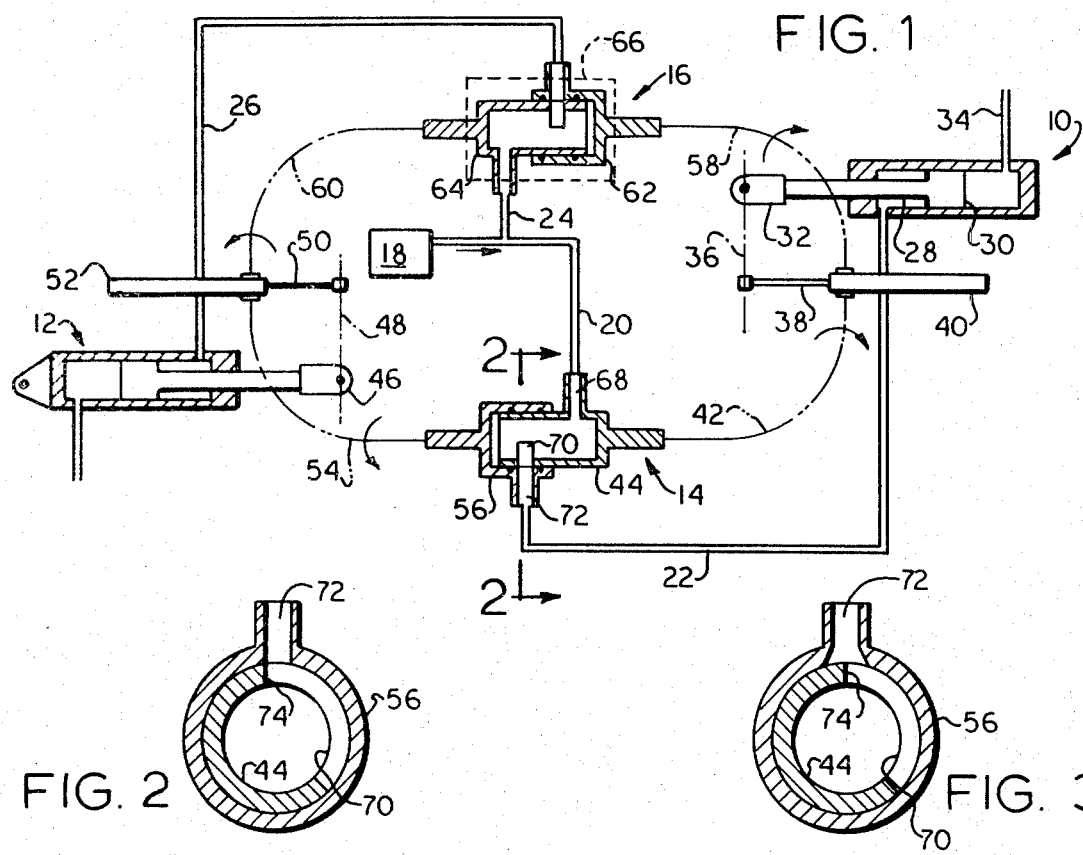
FIG. 1
FIG. 2
FIG. 3
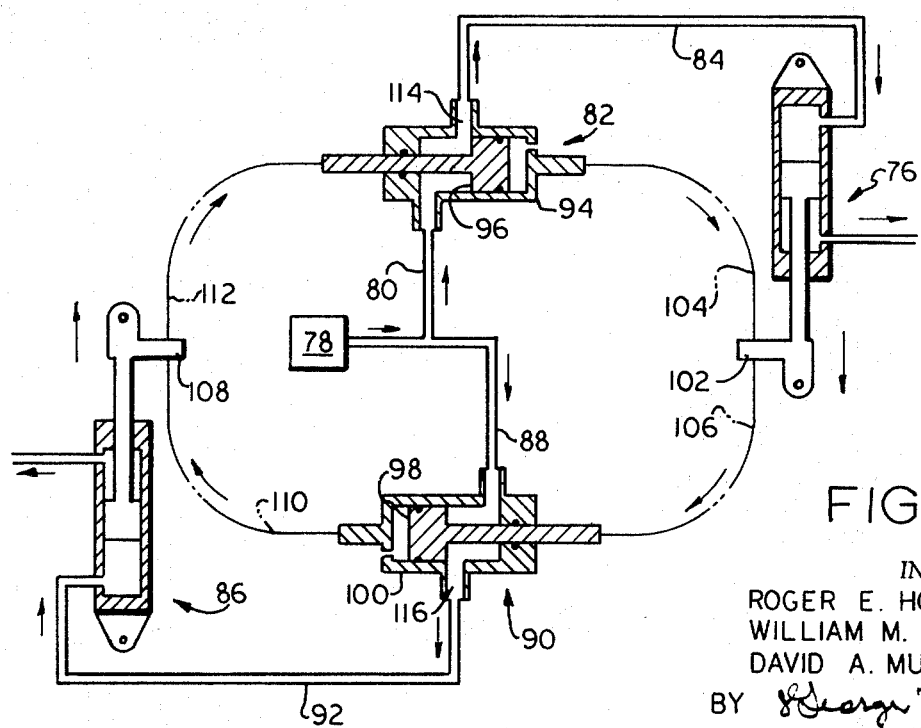
FIG. 4
INVENTOR.
ROGER E. HOWARTH
WILLIAM M. McGUIGAN
DAVID A. MURDAY
BY George E. Pearson
ATTORNEY Patented Sept. 4, 1973

INVENTOR.
ROGER E. HOWARTH
WILLIAM M. McGUIGAN
DAVID A. MURDAY

BY *George E. Pearson*

ATTORNEY

SYNCHRONIZED HYDRAULIC SERVO MOTOR SYSTEM

BACKGROUND OF THE INVENTION

This invention lies in the field of hydraulic servo motor actuation and control and is directed to systems in which two or more such motors are actuated at the same time and connected to a common load or to separate loads. In most installations it is highly desirable or essential that the motors be very accurately synchronized so that the load or loads will be moved in unison. One example is a jet engine pod installation having a large ejector barrel which must be moved axially. Usually two or more servo motors are arranged in spaced relation around the periphery of the pod and connected to the forward end of the ejector barrel. If one of the servo motors advances ahead of synchronism it will tend to cock the ejector barrel and cause it to bind in its tracks. This increases the total force required and may cause damage to the tracks or other components.

Another typical example is an airplane provided with lift-increasing flaps. Since the flaps are spaced at opposite sides of the fuselage, they are normally actuated by separate servo motors. If one flap binds in its mountings the other flap will be extended angularly ahead of it, causing a high rolling moment which may be difficult or impossible to counteract with ailerons or other available controls.

In both of the examples above, it is necessary to provide some type of synchronization to prevent the undesirable consequences. Many systems have been devised, including mechanical interconnection through gearing or linkages, and hydraulic or mechanical feedback devices to modulate the fluid flow to the various servo motors. These systems have in the main been quite operable and performed their functions in a generally satisfactory manner. The principal drawback has been undue complication and maintenance cost.

SUMMARY OF THE INVENTION

The present invention is directed to a total synchronized system which performs the ultimate functions of the previous systems in a simple and straightforward manner with a minimum of relatively simple and duplicate parts, reducing both initial cost and maintenance, and insuring reliable operation.

Generally stated, two or more hydraulic servo motors are provided, each of which has a hydraulically movable drive member. All of the drive members may be connected to a single load or they may each drive a separate load, but in either case they are required to move in synchronism to accomplish their purpose. One or more sources of pressure fluid are connected by separate conduits to each motor, and a synchronizing valve is interposed in each conduit to modulate the flow of fluid to its associated motor.

Each valve includes a pair of valve members which are movable with and with respect to each other, at least one of the members having a fluid port and the other member having means to restrict the area of the port opening to varying degrees. One valve member is drivenly connected to the drive member of its associated motor and the other valve member is drivenly connected to the drive member of the next adjacent motor which may be considered as the preceding or succeeding one. The relative physical location of the components may be whatever is required by any particular installation but the operational relation is such that the motors and valves are alternately arranged sequentially so that every valve is between two motors and every motor is between two valves. Thus it may be stated that the components are arranged in a mechanical "closed-loop" series.

With this arrangement and with all of the motors operating synchronously, the drive members of any two successive motors will cause the two valve members of the intermediate valve to move in the same sense or direction at the same rate so that there will be no relative movement away from neutral, synchronized relation and fluid flow will not be affected. However, if any motor advances ahead of synchronism, its drive member will move its connected valve member at a greater rate to produce relative movement of the two members of the preceding and succeeding valves. The members are so designed and arranged that this relative movement in the valve associated with the leading motor will restrict the flow of fluid to that motor and retard its movement until it is returned to synchronism. However, the relative movement in the other valve will not restrict fluid flow to the lagging motor, and thus the latter will, in effect, "catch up" with the leading motor. In a modification, the porting is so designed that in neutral, synchronized relation the one valve member partially restricts the flow controlling port of the other valve member. However, the port is large enough so that its restricted area is sufficient to allow the designed normal rate of flow. Relative movement in such a valve associated with the lagging motor is in the opposite sense to that of the leading motor valve, and the flow is increased to the lagging motor to accelerate the return to synchronism.

The principle of operation described above may be applied to valves having linear motion or rotary motion and to either one-direction or two-direction actuation with appropriate design changes. In the case of one-direction actuation, a closed loop arrangement is not essential. The components may be arranged diagrammatically in a line with one less valve than the number of motors. Then one motor is the master and the other motors are slaves.

BRIEF DESCRIPTION OF THE DRAWINGS

Various other advantages and features of novelty will become apparent as the description proceeds in conjunction with the accompanying drawings, in which:

FIG. 1 is a schematic illustration of a system in accordance with the invention with two servo motors and two synchronizing valves of the rotary type;

FIG. 2 is a schematic section view taken on line 2—2 of FIG. 1;

FIG. 3 is a view similar to FIG. 2 showing a modification;

FIG. 4 is a view similar to FIG. 1 but incorporating linear motion valves;

DESCRIPTION OF PREFERRED EMBODIMENTS

Figure 6:
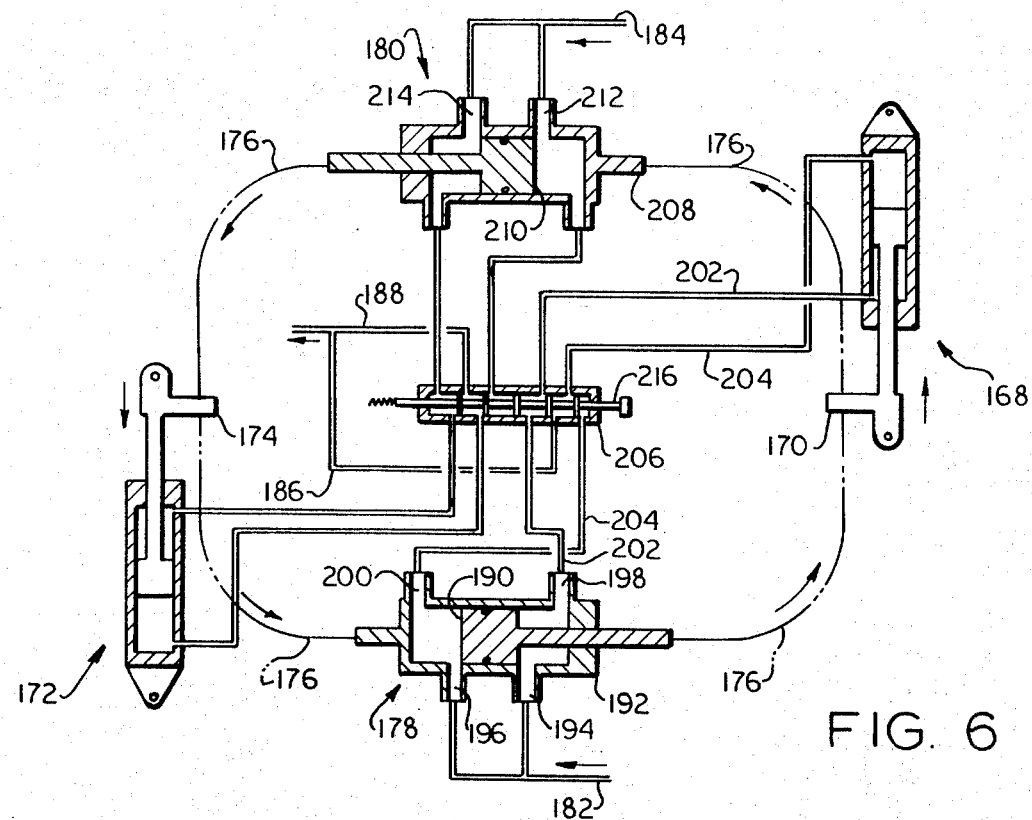
FIG. 6 is a view similar to FIG. 5 showing a different form of two-direction arrangement.

The assembly shown schematically in FIG. 1 includes a first servo motor 10, a second servo motor 12, a first valve 14, and a second valve 16. Fluid under pressure flows from a source 18 through a conduit 20 to and through first valve 14 and thence through conduit 22 to the associated first motor 10. Fluid also flows through conduit 24 to and through second valve 16 and thence through conduit 26 to the associated second motor 12.

Fluid entering chamber 28 of motor 10 drives the piston 30 to the right as viewed in FIG. 1 together with drive member 32, the fluid at the opposite side of the piston exiting through conduit 34 and returning by a path, not shown, to a reservoir at source 18. The drive member is connected by link 36 to the lever arm 38 of the rotatably mounted member 40 which is representative of the load to be moved by motor 10. Rotation of load member 40 causes rotation of linkage 42 in the direction indicated by the arrow, and the linkage in turn rotates valve member 44 in the same sense or direction.

Motor 12 operates in the same manner as motor 10 to pull its drive member 46 to the left as viewed in FIG. 1, and the drive member acts through link 48, lever arm 50 and load member 52 to rotate linkage 54 in the direction indicated by the arrow, and the linkage in turn rotates valve member 56 in the same sense or direction as valve member 44. It will be apparent that drive members 32 and 46 act in the same way through linkages 58 and 60 to rotate valve members 62 and 64 in the direction indicated by the arrows. Thus it will be seen that the motors and valves are mechanically connected together in alternate arrangement to form a mechanical "closed-loop" series. There may be any number of motors and associated synchronizing valves in the series and they may be located where needed or convenient, the rotating linkages being appropriately designed to make the operative connections. If necessary or desired, the valves may be mounted in static outer cases as indicated at 66.

It will be seen that with respect to valve 14, drive member 32 is connected to valve member 44 which is the core, while drive member 46 is connected to valve member 56 which is the sleeve. On the contrary with respect to valve 16, drive member 32 is connected to sleeve 62 and drive member 46 is connected to core 64. When pressure fluid is supplied from source 18, both motors act in unison and rotate both members of each valve in the same direction at the same rate. Thus there is no relative movement between them and no modulation of the pressure fluid flow. However, if the first motor 10, for instance, advances ahead of synchronism, or leads, it will cause core 44 and sleeve 62 to lead sleeve 56 and core 64. The effect of this action will be explained with reference to FIGS. 1 and 2 in conjunction.

First considering valve 14, core 44 has an inlet port 68 connected to conduit 20 and leading to the interior of the core. Near its opposite end the core is provided with a port 70 which extends a substantial distance peripherally and is in registry with port 72 of sleeve 56. In FIG. 2 the valve members are shown in neutral or synchronized relation with port 72 overlying the one end of port 70 and with the lip 74 of the core aligned with one edge of port 72. As shown the valve members are rotating clockwise at the same rate and port 72 is wide open. However, when motor 10 leads motor 12, it causes core 44 to lead sleeve 56 so that lip 74 begins to overlap port 72 as indicated in FIG. 3 and restrict the flow through 72 and conduit 22 to motor 10. This retards motor 10 until it falls back into synchronism, which also returns the valve members to the relation of FIG. 2 with a wide open port.

The valve members of valve 16 under the same circumstances are rotating counterclockwise as viewed in FIG. 2, and when motor 10 leads motor 12 it causes core 64 to lead sleeve 62 counterclockwise. However, in this case an adjacent portion of port 70 registers with port 72 and the latter remains wide open so that fluid flow through conduit 26 to motor 12 is unrestricted and the motor continues to move at the normal pace until it is back in synchronism with motor 10.

It should be understood that in this and all other forms of the invention, if the lagging motors are substantially slowed down by friction or obstructions the valve of the leading motor will increase its flow restriction up to the point of motor stoppage if necessary to correct the difficulty, thus diverting all of the fluid force to the lagging motors.

FIG. 3 further illustrates a modification of the basic valve which is useful for accelerating correction. In this case, port 72 is made larger in cross sectional area than necessary for the normal design rate of flow and core 44 in neutral position is so located that lip 74 forms a partial restriction, but the unrestricted area is sufficient for normal flow. Thus, when core 44 leads sleeve 56 clockwise in one valve such as 14 it restricts flow to its motor and at the same time the core of the other valve leads the sleeve counterclockwise, enlarging the port to provide abnormal flow to the lagging motor and accelerate the correction.

The system shown in FIG. 4 is substantially identical in principle to the system of FIG. 1 but employs linear motions throughout. The first servo motor 76 is fed with pressurized fluid flowing from source 78 through conduit 80, first valve 82, and conduit 84. Second servo motor 86 similarly is fed with pressurized fluid from source 78 through conduit 88, second valve 90, and conduit 92. The first valve 82 includes sleeve 94 and core 96, while the second valve includes core 98 and sleeve 100. The drive member 102 of motor 76 is connected to push-pull linkages 104 and 106, and the drive member 108 of motor 86 is connected to push-pull linkages 110 and 112. Cores 96 and 98 are shown in neutral position immediately adjacent to ports 114 and 116 in sleeves 94 and 100.

Figure 9:
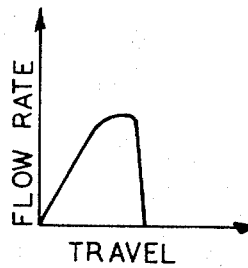
FIG. 9 is a graph illustrating the flow variation through the valve of FIG. 7.

When fluid pressure is applied, all of the components move in a clockwise direction as indicated by the arrows at a uniform rate. If motor 76 advances ahead of synchronism, drive member 102, pulling on linkage 104, will cause sleeve 94 to lead core 96 and the latter will begin to overlap port 114, restricting fluid flow through conduit 84 to retard motor 76. At the same time, drive member 102, pushing on linkage 106, will cause core 98 to lead sleeve 100, but in this case the core moves away from the port and there is no restriction. Therefore motor 86 will not be retarded and synchronism will be achieved. The cores may be set to partially restrict the ports 114 and 116 in neutral position as explained with reference to FIG. 3 to accelerate the return to synchronism.

area will increase at a varying rate to a maximum and then drop off very rapidly to zero as the ports go out of registry. The variation in flow rate is illustrated in the graph of FIG. 9. The shapes shown are merely illustrative, and suitable designs may be worked out to produce any desired pattern of flow variation. The same type of variable flow control can be used in the rotary valve systems.

It will be apparent that the various forms of the invention illustrated and described herein provide a very effective system for synchronizing a plurality of servo motors. It is particularly advantageous for use in installations having a plurality of pressure fluid sources which may tend to operate at different flow rates or pressures. The regulating units are quite simple and relatively inexpensive to manufacture and maintain, and their simplicity insures reliable operation.

Having thus described the invention, what is claimed as new and useful and is desired to be secured by U. S. Letters Patent is:

1. A synchronized hydraulic servo motor system comprising:
   a plurality of hydraulic servo motors adapted to operate in synchronism and each having a hydraulically movable drive member connected to a load; pressure fluid supply means; conduit means connecting the fluid supply means to the motors and at least two synchronizing valve means interposed in the conduit means; each value means comprises two valve members movable together in synchronism and movable separately with respect to each other out of synchronism and mechanically connected to at least two separate drive members each of said drive members connected to one movable member from each of said valve means to be driven thereby; the advance of any drive member ahead of synchronism causing movement of the valve members with respect to each other to restrict fluid flow to the motor associated with such drive member and retard its movement until it is returned to synchronism.

2. A system as claimed in claim 1; the relative movement of the valve members out of synchronism acting to increase fluid flow to at least one lagging motor to accelerate the return to synchronism.

3. A synchronized hydraulic servo motor system comprising:
   at least two hydraulic servo motors adapted to operate in synchronism and each having a hydraulically movable drive member connected to a load; pressure fluid supply means; conduit means connecting the fluid supply means to each of the motors; and a synchronizing valve interposed in the conduit means between the pressurized fluid supply and each motor; each valve including first and second valve members movable with and with respect to each other and a flow path extending through the valve, with the valve members so constructed and arranged that relative movement in a first sense restricts flow and relative movement in a second, opposite, sense does not restrict flow; all of the valves and motors being arranged in a mechanical "closed-loop" series with each valve between succeeding motors and each motor between succeeding valves, and with one valve member of each valve drivenly connected to the drive member of the preceding motor and the other valve member drivenly connected to the drive member of the succeeding motor; the advance of the drive member of any motor ahead of synchronism causing relative movement of the valve members in the first sense in its associated valve to restrict fluid flow to such motor and retard its movement until it is returned to synchronism.

4. A system as claimed in claim 3; the advance of the drive member of such motor ahead of synchronism further causing relative movement of the valve members in the second, opposite, sense in the valves associated with the next adjacent motor to increase fluid flow to it and accelerate the return to synchronism.

5. A system as claimed in claim 3; in which one valve member of each valve is a sleeve having at least one port, and the other valve member is a core coaxially mounted within the sleeve and movable with and with respect to the sleeve; the core being relatively movable to positions restricting the opening in the port in varying degrees.

6. A system as claimed in claim 5; the valve members having a neutral, synchronized position in which the core partially restricts the port; the core being movable relative to the sleeve in one sense to further restrict the port and in the opposite sense to reduce the restriction of the port.

7. A system as claimed in claim 5; in which the valve members are caused to move linearly on their common longitudinal axis in the same direction by the drive members of adjacent motors.

8. A system as claimed in claim 5; in which the valve members are caused to rotate about their common axis in the same direction by the drive members of adjacent motors.

9. A system as claimed in claim 8; in which a first valve member has a port of predetermined size and the second valve member has a port of greater size elongated about the periphery, and in neutral, synchronized position the first port is located substantially at one end of the second port; the second port being relatively movable in one direction to restrict the second port and relatively movable in the opposite direction without restricting the first port.

10. A system as claimed in claim 3; in which one valve member of each synchronizing valve is a sleeve having an inlet port and an outlet port, and the other valve member is a core coaxially mounted within the sleeve and relatively movable to positions restricting the opening in at least one of said ports; first and second conduits leading from the outlet port of each synchronizing valve to first and second adjacent motors; a first check valve in the first conduit openable under fluid pressure to allow fluid from the outlet port to the first motor; a second check valve in the second conduit to block fluid flow from the outlet port to the second motor; the elements being so connected and arranged that advance of the drive member of the first motor ahead of synchronism will cause the core to restrict at least one port in the sleeve to restrict fluid flow to the first motor and retard its action until it is returned to synchronism; and means to reverse fluid flow through the motors and synchronizing valves; the first check valve blocking return flow from the first motor to the outlet port and the second check valve opening in response to fluid pressure to allow fluid flow from the second motor to the outlet port to provide two-direction actuation of the motors; the synchronizing The synchronizing system of FIGS. 1 to 4 operates in one direction only, as shown, and a closed loop arrangement is not essential. The components may be arranged in a line with one less valve than motors, and then one motor is the master and the other motors are slaves.

Figure 5:
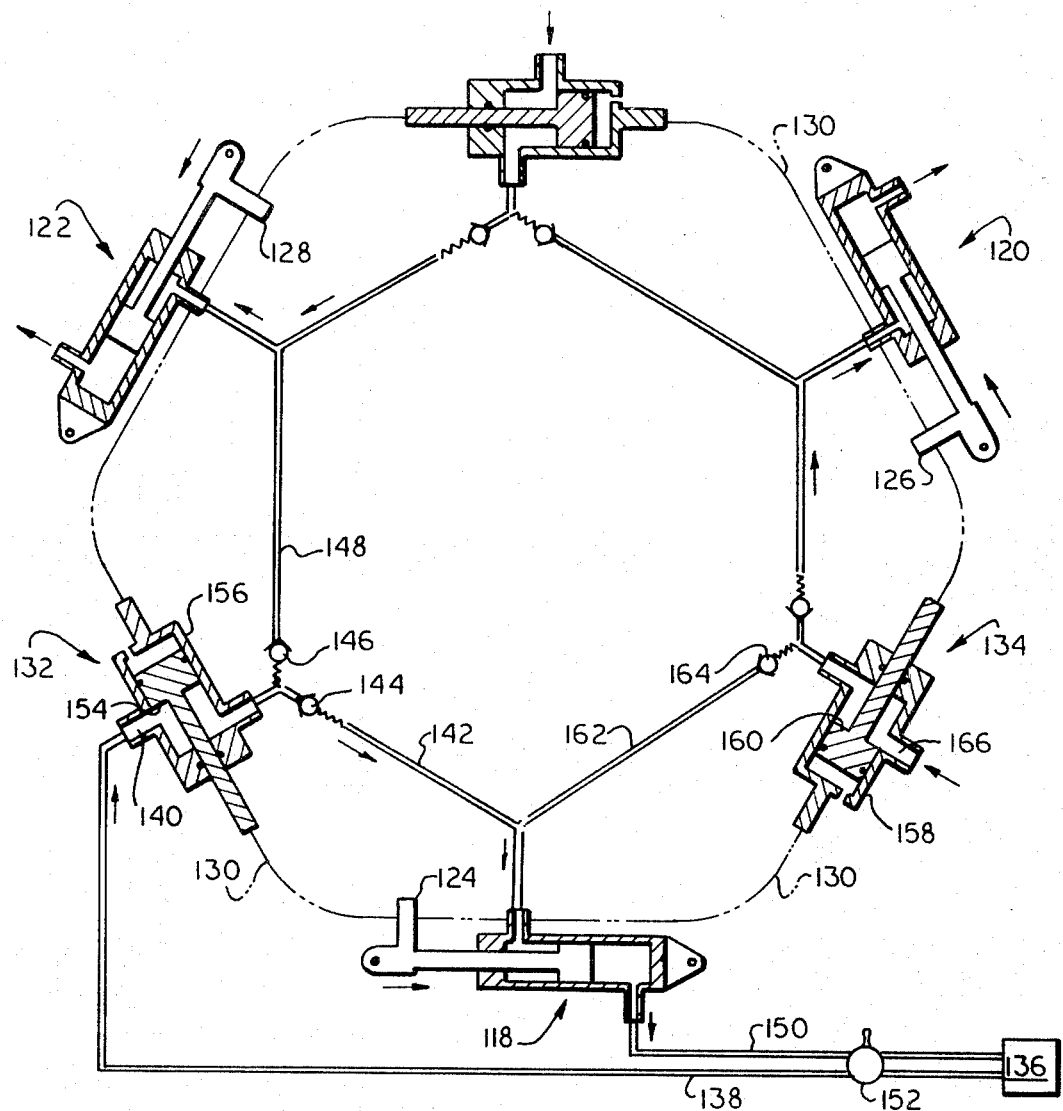
FIG. 5 is a view similar to FIG. 4 but showing a two-direction arrangement.

The construction of FIG. 5 shows that more than two sets of motors and valves may be used in a system and also illustrates one suitable arrangement for synchronizing operations in two opposite directions. In this case, servo motors 118, 120, and 122 are provided with drive members 124, 126 and 128 respectively, and the drive members are connected by linkages 130 to the valve members in the same way as the corresponding elements in FIG. 4. Since all of the units operate in the same way, the description will be limited to motor 118 and valves 132 and 134.

In the neutral condition shown, pressure fluid flows from source 136 through conduit 138 and port 140 to and through valve 132 and thence through conduit 142 to motor 118. A check valve 144 in line 142 yields to allow the flow to motor 118 while another check valve 146 in conduit 148 prevents flow to motor 122. A return conduit 150 leads from motor 118 back to source 136, and a two-way control valve 152 interposed in conduits 138 and 150 provides for reverse flow to actuate motor 118 in the opposite direction. Similar conduits and valves are connected from the source to the other motors.

When pressure fluid is provided, the entire assembly moves in a counter clockwise direction. If motor 118 now advances ahead of synchronism its drive member 124, through linkage 130 will pull core 154 of valve 132 and cause it to lead sleeve 156, thus restricting flow through port 140 to motor 118 and retarding the latter. At the same time, drive member 124, through linkage 130, will push sleeve 158 of valve 134 and cause it to lead core 160 but this will not restrict flow through valve 134 to motor 120.

When valve 152 is swung to reverse flow position, fluid will flow from source 136 through conduit 150 to motor 118. The exhaust fluid from the motor cannot pass check valve 144 and therefore flows through conduit 162 to valve 134. It overcomes check valve 164 readily because of the low pressure in the return line. The other two motors and their new synchronizing valves operate in the same way. In this case the entire assembly moves in a clockwise direction. If motor 118 now starts to lead, it will pull sleeve 158 through linkage 130 and cause it to lead core 160 which will therefore restrict return flow through port 166 and retard motor 118. It will also cause core 154 to lead sleeve 156 but this will not restrict port 140. Thus it will be seen that the assembly operates in the same way regardless of the direction of travel.

The system shown in FIG. 6 is similar in layout to the one in FIG. 4 but is designed for two-direction operation. Again there is a first servo motor 168 with a drive member 170 and a second servo motor 172 with a drive member 174, and linkages 176 connecting the drive members with synchronizing valves 178 and 180. A source of supply, not shown, provides pressurized fluid to conduits 182 and 184 leading to valves 178 and 180, and conduits 186 and 188 deliver the exhaust fluid to the return line. Valve 178 includes a core 190 and a sleeve 192 which is provided with longitudinally spaced inlet ports 194, 196 and longitudinally spaced outlet ports 198, 200. The core is neutrally located between the two inlet ports and extends the full distance between them so that any longitudinal relative motion will restrict one port or the other. The outlet ports could be spaced the same as the inlet ports if desired.

Conduit 202 leads from port 198 to the rod end of motor 168 and conduit 204 leads from port 200 to the head end of the motor. A spool valve 206 is interposed in these conduits and is shown set for operation in a selected direction, in which conduit 202 has a free path through the valve while the supply end of conduit 204 is cut off from the motor, and the motor end of conduit 204 is connected through the spool valve to exhaust conduit 186. The relation of valve 180 to motor 172 is exactly the same and need not be discussed.

With all parts in the position shown, fluid from the source will flow through valves 178 and 180 to the rod ends of motors 168 and 172 and cause the entire assembly to move counter clockwise as indicated by the arrows with the synchronizing valves remaining in neutral relation. If motor 168 should advance ahead of synchronism it will pull core 190 through linkage 176 and cause it to lead sleeve 192. The core will then restrict port 194 and the flow through conduit 202, thus retarding motor 168. At the same time the drive member 170 will push sleeve 208 through linkage 176 and cause it to lead core 210. The core will restrict port 212 but move away from port 214 which is at this time supplying the open line to motor 172. Therefore the latter will not be retarded.

For operation in the reverse direction, the spool valve stem 216 is pushed to the left which opens conduit 204 from port 200 to the head end of the motor 168 and connects the motor end of conduit 202 to exhaust conduit 186. A similar change of connections is produced in the circuit of motor 172. When pressure fluid is now provided, the assembly will move clockwise. If motor 168 now advances ahead of synchronism, drive member 170 will push core 190 through linkage 176 and cause it to lead sleeve 192 which also causes it to restrict port 196, thus restricting flow through conduit 204 and retarding motor 168. At the same time drive member 170 will pull sleeve 208 through linkage 176 and cause it to lead core 210. The latter will then restrict port 214 but move away from port 212 which is supplying the open line to motor 172. Therefore, the latter will not be retarded.

Figure 7:
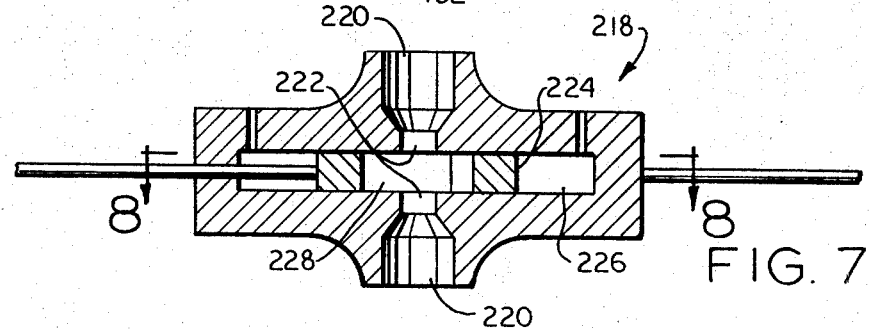
FIG. 7 is a schematic sectional elevation view of a valve having variable porting.
Figure 8:
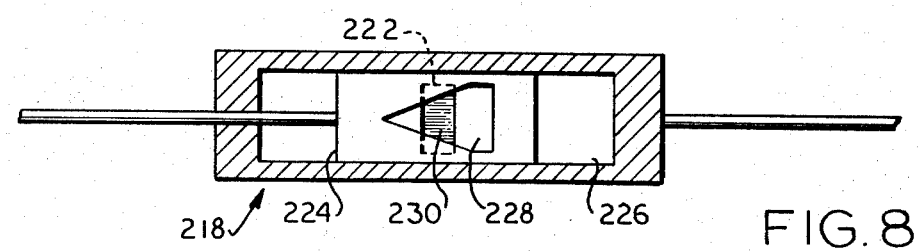
FIG. 8 is a schematic sectional plan view of the valve of FIG. 7, taken on the line 8—8 of FIG. 7.

A modified form of synchronizing valve is illustrated in FIGS. 7 and 8, and its principle can be applied to any of the systems previously described. In this form a sleeve 218 is provided with duplicate inlet and outlet ports 220, the inner ends 222 of which have a selected cross sectional shape, here shown as a rectangle. The linearly slidable core 224 is in the form of a flat plate slidable in recess 226. Generally centrally located in the plate is a port 228 which, in planform, comprises a combined triangle and rectangle. The valve members are shown in their neutral position and it will be observed that the solid portion of the core blocks off the ends of the port 222, leaving open the shaded area 230. This area is sufficient to provide the normal design flow to operate the servo motors at the desired rate.

If the core is assumed to be stationary and the sleeve is moved to the left as viewed in FIGS. 7 and 8, port 222 will move toward the narrow end of port 228 and the common flow area will decrease at a varying rate. If sleeve 218 is moved to the right, the common flow valve serving to control fluid flow to the second motor during reverse flow operation.

11. A system as claimed in claim 3; in which one valve member of each synchronizing valve is a sleeve and the other valve member is a core coaxially mounted within the sleeve; each sleeve having two longitudinally spaced inlet ports and two longitudinally spaced outlet ports; the core in neutral, synchronized position lying generally centrally between the ports and being movable longitudinally in either direction to restrict at least one of the ports; conduits extending from each of the outlet ports of each synchronizing valve to its associated motor; a direction control valve interposed in both conduits to each motor to selectively connect one of them to the motor for actuation in the selected direction; the motors and their associated synchronization valves being so connected that advance of any motor ahead of synchronization in either direction will actuate its associated synchronizing valve to restrict fluid flow to the motor to retard its movement until it is returned to synchronism.

12. A system as claimed in claim 3; each of the valve members of each valve having a port for fluid flow; the ports being of different cross sectional shapes and at least partially overlying each other in neutral, synchronized position to provide a common flow area sufficient for normal fluid flow; the valve members being so arranged that relative movement in one sense restricts fluid flow at varying rates and relative movement in the opposite sense enlarges the common area to increase fluid flow at varying rates.

* * * * *